United States Patent [19]

Cuzin et al.

[11] Patent Number: 4,839,441

[45] Date of Patent: Jun. 13, 1989

[54] POLYESTERAMIDES, POLYETHERESTERAMIDES AND PROCESS FOR PREPARATION THEREOF

[75] Inventors: Daniel Cuzin, Port Marly; Didier Judas, Paris, both of France

[73] Assignee: Atochem, Puteaux, France

[21] Appl. No.: 157,370

[22] Filed: Feb. 17, 1988

[30] Foreign Application Priority Data

Feb. 26, 1987 [FR] France ................. 87 02569

[51] Int. Cl.$^4$ ............................................. C08G 69/44
[52] U.S. Cl. ................................. 528/328; 525/434
[58] Field of Search ............... 525/434; 528/328, 291

[56] References Cited

U.S. PATENT DOCUMENTS 2,812,313  11/1957  Nischk et al. ...................... 525/434
3,555,114   1/1971  Reimschuessel et al. .

Primary Examiner—Veronica P. Hoke
Attorney, Agent, or Firm—Burgess, Ryan & Wayne

[57] ABSTRACT

Novel polyesteramides and polyetheresteramides are provided which have the formula:

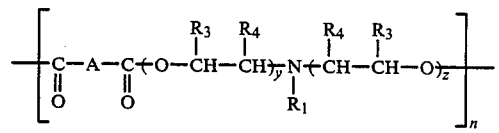

wherein

A represents a divalent polyamide group, $R_3$ and $R_4$ represent hydrogen, or only one of $R_3$, or $R_4$ is an alkyl radical containing from 1 to 24 carbon atoms, $R_1$ is a linear or branched, alkyl radical, or an unsaturated radical containing from 1 to 24 carbon atoms or an aromatic or cycloaliphatic radical, $y+z$ has a value between 2 and 100, n represents a number such that the recurring units constitute a macro molecular chain. These products are obtained by polycondensation of a dicarboxylic polyamide with $\alpha$, $\omega$ diol which is a hydroxylated beta-tertiary amine or a polyoxyalkyleneglycol containing in the chain one tertiary amine function.

12 Claims, No Drawings

POLYESTERAMIDES, POLYETHERESTERAMIDES AND PROCESS FOR PREPARATION THEREOF

FIELD OF THE INVENTION

This invention relates in general to novel polyesteramides and polyetheresteramides. In one aspect, this invention relates to a process for the preparation of polyesteramides and polyetheresteramides by the condensation of a dicarboxylic polyamide with an alpha, omega-diol.

SUMMARY OF THE INVENTION

The polyesteramides and polyetheresteramides of the present invention have the formula:

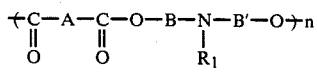

wherein A designates a divalent polyamide group and

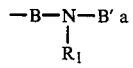

structure derived from an α,ω diol containing in the chain a tertiary amine function to which is attached an aromatic or cycloaliphatic or alkyl radical $R_1$.

These polyesteramides and polyetheresteramides are obtained by the reaction of one dicarboxylic polyamide with one di beta hydroxylated tertiary amine or one polyoxyalkylene glycol including in the chain a tertiary amine function.

The presence of the $R_1$ radical fixed on the tertiary amine function in the polymer obtained provides a polyamide possessing a good water resistance unlike the polyamides already known that are obtained by reaction of a dicarboxylic polyamide on one simple hydroxylated polyoxyalkyleneglycol, as described in French Pat. Nos. 2,401,947 and 2,273,021.

DETAILED DESCRIPTION OF THE INVENTION

More precisely, the products according to the invention correspond to the general formula

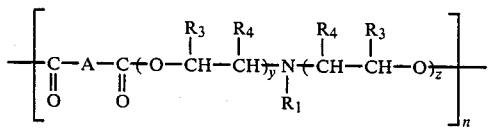

wherein $R_3$ and $R_4$ represent hydrogen or only one of the two represents hydrogen, the other one being an alkyl radical containing from 1 to 24 carbon atoms, preferably containing only 1, $R_1$ is a linear or branched, saturated or unsaturated alkyl radical containing from 1 to 24 carbon atoms or an aromatic or cycloaliphatic radical, y+z has a value between 2 and 100, y and z individually being at least equal to 1, n represents the number of recurring units that constitute a macromolecular chain and preferably is not less than 1 with 75 as the maximum.

In case y and z are equal to 1, the corresponding product is a polyesteramide.

The proportion by weight of the group

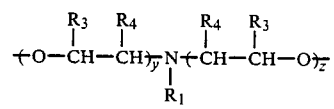

in relation to the total group

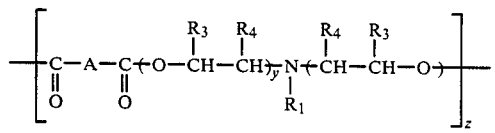

can fluctuate from 2 to 90%, preferably from 5 to 85%.

The dicarboxylic polyamide sequence

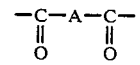

is known per se.

It usually corresponds to the group:

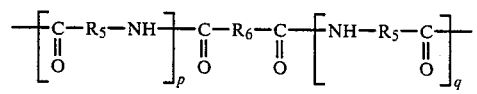

wherein: $R_5$ is a hydrocarbon chain constituting a lactam and/or an aminoacid, the number of carbon atoms of which is preferably between 4 and 14, or the structure

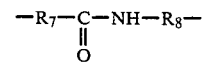

wherein $R_7$ and $R_8$ are respectively the hydrocarbon residue of a diacid and of a diamine, $R_6$ represents the rest of the organic diacid used as a chain limiting agent. This can be, for instance, an aliphatic, cycloaliphatic, or aromatic group, p and q, which are identical or different and one of the two can be zero, represent a repetition of a number of recurring units that constitute the macromolecular chain of the dicarboxylic polyamide sequence.

The medium molecular weight of the dicarboxylic polyamide sequence is between 300 and 15,000 and preferably between 600 and 5,000, p+q are between 1 and 100 and preferably between 2 and 40.

The polyesteramides and polyetheresteramides according to the invention again can generally have the formula:

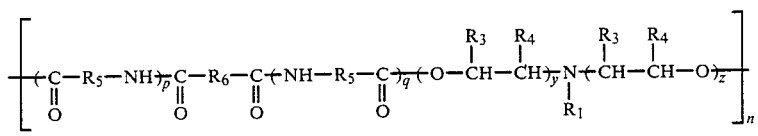

wherein $R_1$, $R_3$, $R_4$, $R_5$, $R_6$, p, q, y, z and n are as defined above.

The products according to the invention are obtained by reaction of a dicarboxylic polyamide whose acid functions are situated at the ends of the chain with an $\alpha,\omega$ diol, which is either a hydroxylated di beta tertiary amine or a polyoxyalkylene glycol including in the chain a tertiary amine function. The reaction can be shown as follows:

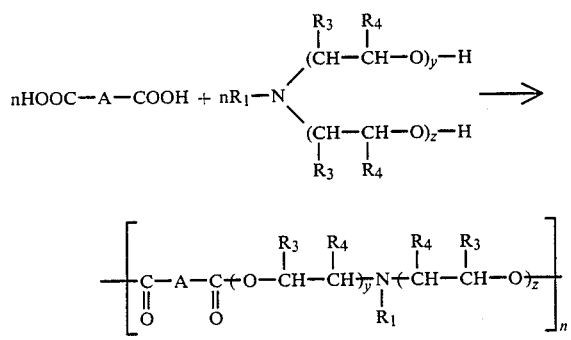

wherein the symbols A, $R_1$, $R_3$, $R_4$, y, z and n are defined as above.

When the $\alpha,\omega$ diol is a hydroxylated di beta tertiary amine, its polycondensation with an $\alpha,\omega$ dicarboxylic polyamide provides a polyesteramide including at least one tertiary amine function per chain. When the $\alpha,\omega$ diol is a polyoxyalkylene glycol including in the macromolecular chain a tertiary amine function on which is fixed an alkyl, aromatic or cycloaliphatic radical, the product obtained by polycondensation with an dicarboxylic polyamide is a polyetheresteramide containing at least one tertiary amine function per chain.

The test of the $\alpha,\omega$ diol representing the group

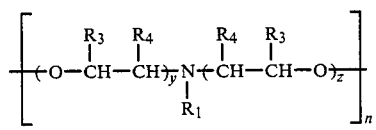

can be in proportion of from 2 to 90% by weight and preferably from 5 to 85% in the macro molecule of the polyamide obtained.

The polycondensation reaction between the dicarboxylic polyamide and the $\alpha,\omega$ diol, usually in respective proportions by weight comprised between 95 and 15% to 5 to 85%, is effected by mixing in a molten state the reagents in the presence of a catalyst. The condensation is usually effected while stirring at a temperature between 100° and 350° C., preferably between 180° and 300° C., within a period of from 10 minutes to 15 hours according to the nature and the weight of each one of the reagents. The reaction can be conducted at a substantially atmospheric pressure in an inert medium or under vacuum on the order of from 6 to 670 Pa.

In order that the polycondensation reaction is effected under the most favorable conditions, it is recommended to react the reagents substantially taking into consideration the stoichiometry between the carboxylic groups of the polyamide and the hydroxyl groups of the $\alpha,\omega$ diols including a tertiary amine function per molecule.

The catalysts recommended for the preparation of these polyesteramides and polyetheresteramides are metal tetraalkoxides corresponding to the general formula $M(OQ)_4$ wherein M represents titanium, zirconium or hafnium. Within the same molecule, the identical or different Q groups designate linear or branched alkyl radicals having from 1 to 24 carbon atoms and better from 1 to 8. As examples of catalyst there can be cited $Zr(OC_2H_5)_4$, $Zr(O\text{-}isoC_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$, $Hf(O\text{-}isoC_3H_7)_4$, $Ti(OC_4H_9)_4$. It is used alone or mixed in convenient proportion by weight of about 0.01 to 5% of the whole of the reaction medium.

The dicarboxylic polyamides included in the preparation of the products of the invention are known per se. They are obtained by classical methods of preparation of such polyamides, as for example, by polycondensation of a lactam and/or an aminoacid, or of a diacid and a diamine. These polycondensations are carried out in the presence of an organic diacid whose acid functions are preferably fixed at each one of the ends of the molecule. The diacids adhere during the polycondensation as constituents of the macromolecular chain of the polyamides and they act as limiting agents of the chain, which provides the $\alpha,\omega$ dicarboxylic polyamides. Depending on the amount of the excess of organic diacid in the polycondensation, it is possible to adjust the length of the macromolecular chain and consequently the medium molecular weight of the polyamide.

The carboxylic diacids used in the synthesis reaction of the polyamide for allowing the fixation of a carboxylic group to each one of the ends of the polyamide chain, while playing the part of a limiting agent of the chain, are specially: the alkane-dioic diacids such as the succinic, adipic, suberic, azelaic, sebacic, undecanoic, dodecanoic acids or also the cycloaliphatic or aromatic diacids such as terephthalic, isophthalic, or cyclohexanedicarboxylic acids.

The lactams and aminoacids used in the preparation of dicarboxylic polyamides have a hydrocarbon chain whose number of carbon atoms is preferably between 4 and 14. They are usually selected among: butyrolactam, caprolactam, oenantho lactam, decalactam, undecanolactam, dodecanolactam, 6-amino hexanoic acid, 10-amino decanoic acid, 11-aminoundecanoic acid, 12-aminododecanoic acid, and the like.

Among the polyamides resulting from the polycondensation of a diacid with a diamine there can be cited the 6-6, 6-9, 6-10 and 6-12 nylons obtained from hexamethylene diamine and adipic, azalaic, sebacic and 1-12 dodecanoic acid or also the 9-6 nylon obtained from nonamethylene diamine and adipic acid.

The dicarboxylic polyamides used in the preparation of the products of the invention have medium molecular weights that can fluctuate within a broad range. These medium molecular weights are preferably between 300 and 15,000 and preferably between 600 and 5,000.

The $\alpha,\omega$ diols used in the preparation of the products of the invention are known per se. They are obtained by adding an alkylene oxide to a primary amine according to the reaction

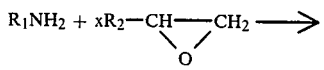

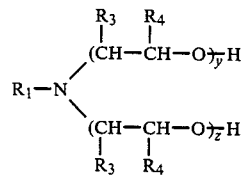

wherein $R_1$ corresponds to a linear or branched, saturated or unsaturated, alkyl radical containing from 1 to 24 carbon atoms or an aromatic or cycloaliphatic radical, $R_2$ corresponds to hydrogen or to an alkyl radical containing from 1 to 24 carbon atoms knowing that $R_3 = R_2$ if $R_4 = H$ and/or $R_3 = H$ if $R_4 = R_2$ and $x = y + z$.

The addition of the alkylene oxide to the primary amine results in the formation of a dihydroxylated $\alpha,\omega$ compound in which the length of the chain that is, the medium molecular weight essentially depends on the amount of alkylene oxide added.

It is also possible to cause several different alkylene oxides to react.

When y and z are equal to 1 which corresponds to the addition of 2 moles alkylene oxide per mole of amine, the resulting compound is a hydroxylated di beta tertiary amine. When x is more than 2 which means that at least y or z is more than 1, the product obtained is then a polyoxyalkyleneglycol including in the macromolecular chain a tertiary amine function the position of which exclusively depends on the respective values of y and z.

The primary amines capable of reacting with the alkylene oxide can be selected, for example, among the linear or branched alkane amines such as: methylamine, ethylamine, n-propylamine, n-butylamine, isobutylamine, n-hexylamine, n-heptylamine, n-octylamine, n-decylamine, n-undecylamine, n-dodecylamine, n-tetradecylamine, n-hexadecylamine, n-octadecylamine, n-eicosanoylamine, n-decosanoylamine, n-tetracosanoylamine; among the amines with an unsaturated carbonated chain such as octadecyl-10-enyl-1-amine, octadecyl 10,13-dienyl-1-amine, octadecyl-10,13,16-trienyl-1-amine, among mixtures of amines with linear or branched, saturated and unsaturated, carbon chain obtained from fatty acids of copra, tallow or olein, or also among aromatic or cycloaliphatic amines such as aniline, benzylamine, orthotoluidine, and cyclohexylamine.

Among the alkylene oxides that can be added to the primary amine, there are preferably chosen ethylene oxide and propylene oxide.

The hydroxylated di beta tertiary amines or the polyoxyalkyleneglycols used in the preparation of the products of the invention have molecular weights that can fluctuate within a broad range. The molecular weights are preferably between 119 and 6,000 and more suitably between 119 and 3,000.

The polyesteramides and polyetheresteramides of this invention are useful for a wide variety of applications. Since the compounds are thermoplastic, they can be fabricated into films, sheets, molded articles and the like, by known techniques such as extrusion or injection molding. The materials are useful as packaging materials, containers and the like.

The examples that follow illustrate the invention without limiting it.

In these examples:

the hardness SHORE D is given according to the ASTM D 1484 standard, the stress is expressed in MPa and the elongation in percent to the threshold of flow and to the tensile strength according to the ASTM D 638 standard, the Vicat point in °C. is expressed according to the ASTM D 1525 standard, the deflection is given in mm, the stress in MPa and the module in MPa in the flexion tests according to the ASTM D 790 standard, the inherent viscosity of each polycondensate has been measured in metacresol at 20° C. (0.5 g of product per 100 g of solvent), it is expressed in $dlg^{-1}$, the melting point has been determined by differential thermal analysis.

EXAMPLE 1

In a stainless steel reactor of 6 liters there are introduced 1664 g of a dicarboxylic polyamide 12 having a medium molecular weight of 2080 prepared previously by polycondensation of the dodecanolactam in the presence of adipic acid. There are then added 304 g of a mixture of oxyethylated tertiary amines having a medium molecular weight of 380 and previously obtained by adding 2.7 moles ethylene oxide to a mixture of primary amines derived from tallow fatty acids. There are also added 9.8 g tetra butylorthozirconate.

After having placed the reaction medium under an inert atmosphere, it is heated until the temperature has reached 240° C. A vacuum of 27 Pa is created inside the reactor while continuing stirring strongly from the moment the constituents melt.

The reaction is thus continued for 1 hour at 240° C.

In proportion as the viscosity increases, the speed of stirring must be reduced.

The polyesteramide is collected at the exit of the reactor in the form of liquid reeds that solidify and cool by immersion in a vat of water. The product is then granulated, dried and molded on an ARBURG press in the form of standardized test pieces that make it possible to carry out traction and flexion tests.

These tests have resulted in the following values:

60 SHORE D hardness elongation in traction is 24% under 22 MPa to the flow threshold and 195% under 35 MPa to rupture, in flexion the module is 344 MPa with a stress of 10.5 MPa and a deflection of 24 mm, the Vicat point under 1 kg is 147.5° C.

This polyesteramide has an inherent viscosity of 0.50 $dlg^{-1}$. Its melting point is 160° C.

The polyetheresteramide corresponds to the formula:

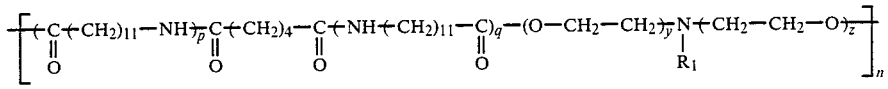

with p+q=9.82 and y+z=2.7 and $R_1 = C_{14}H_{29}$ (2%), $-C_{16}H_{33}$ (25%), $-C_{18}H_{37}$ (30%), $C_{20}H_{41}$ (3%) and 40% of a mixture of $C_{18}H_{35}$, $-C_{18}H_{33}$ and $-C_{18}H_{31}$.

EXAMPLE 2

Following a mode of operation similar to that of Example 1, 1500 g of dicarboxylic polyamide 11 resulting from the polycondensation of amino-11-undecanoic acid in the presence of adipic acid of a medium molecular weight of 2,010 are reacted with 440.3 g of a mixture of oxyethylated amines having a medium molecular weight of 590 resulting from the addition of 8.61 moles of ethylene oxide to a mixture of primary amines derived from copra fatty acids in the presence of 5.9 g of tetrabutylorthozirconate during 90 minutes at 245° C. under a pressure of 27 Pa.

The polyetheresteramide prepared under these conditions has the following characteristics:

| | |
|---|---|
| inherent viscosity | 0.80 dlg$^{-1}$ |
| melting point | 169° C. |
| Vicat point under 1 kg | 155° C. |
| SHORE D hardness | 54 |
| traction properties | |
| elongation to the flow threshold | 50% under 19.9 MPa |
| elongation to rupture | 40% under 39.7 MPa |
| properties in flexion | |
| deflection | 24 mm |
| stress | 6.6 MPa |
| module | 242 MPa |

It corresponds to the formula with p+q=10.19; y+z=8.61 and $R_1 = -C_{10}H_{21}$ (3%), $-C_{12}H_{25}$ (60%), $-C_{14}H_{29}$ (20%), $-C_{16}H_{33}$ (10%) and $-C_{18}H_{37}$ (7%).

EXAMPLE 3

Following the mode of operation of Example 1, 1620 g of a dicarboxylic polyamide 6 obtained by polycondensation of the caprolactam in the presence of adipic acid, having a medium molecular weight in 1540, are reacted with 399.75 g of the mixture of oxyethylated tertiary amines used in Example 1 in the presence of 21 g of tetrabutylorthozirconate.

The duration of reaction at 250° C. and under extensive vacuum is of 8 hours.

The melting point of the polymer obtained is 200° C. and it has the following characteristics:

| | |
|---|---|
| SHORE D hardness | 62 |
| inherent viscosity | 0.70 dlg$^{-1}$ |
| Vicat point under 1 kg | 174° C. |
| properties in traction | |
| elongation to the flow threshold | 18% under 21.4 MPa |
| elongation to rupture | 340% under 30 MPa |
| properties in flexion | |
| deflection | 25 mm |
| stress | 9.4 MPa |
| modle | 327 MPa |

The polyetheresteramide corresponds to the formula:

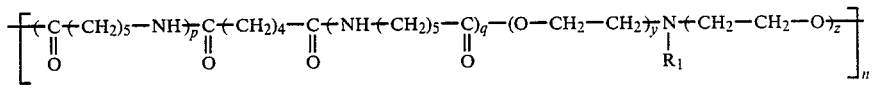

with p+q=12.34 and y+z=2.7 and $R_1 = -C_{14}H_{29}$ (2%), $-C_{16}H_{33}$ (25%), $-C_{18}H_{37}$ (30%), $C_{20}H_{41}$ (3%) and 40% of a mixture of $C_{18}H_{35}$, $-C_{18}H_{33}$ and $-C_{18}H_{31}$.

EXAMPLE 4

In a stainless steel reactor of 6 liters there are introduced 1900 g of the dicarboxylic polyamide 12 used in Example 1. There are added 108.7 g N-methyl diethanolamine and 15.46 g tetrabutylorthozirconate.

After having placed the reaction medium under inert atmosphere, it is heated until the temperature has reached 210° C. After 1 hour at this temperature, a vacuum is created inside the reactor proceeding by stages while increasing the temperature of the reaction medium to 240° C. The reaction is thus continued for 3 hours under a pressure of 40 Pa.

The polyesteramide prepared under these conditions has the following characteristics:

| | |
|---|---|
| SHORE D hardness | 66 |
| inherent viscosity | 0.50 dlg$^{-1}$ |
| Vicat point under 1 kg | 154° C. |
| melting temperature | 163° C. |
| properties in traction | |
| elongation to the flow threshold | 12.5% under 26 MPa |
| elogation to rupture | 371% under 36.5 MPa |
| properties in flexion | |
| deflection | 27 mm |
| stress | 15 MPa |
| module | 490 MPa |

The polyetheresteramide corresponds to the following formula:

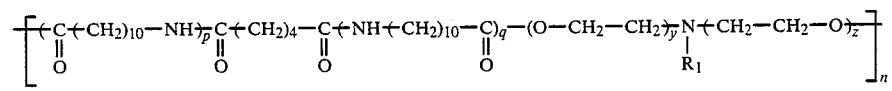

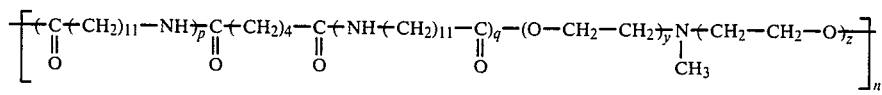

with p+q=9.82 and y=Z=1.

Formula of the polyetheresteramide obtained in Example No. 5

EXAMPLES 5 TO 11

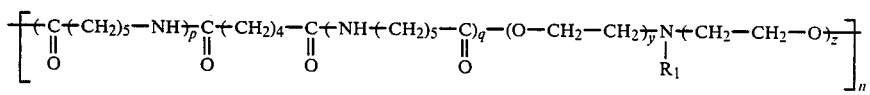

Following the mode of operation of Example 1, a dicarboxylic polyamide 6, 11 or 12 previously obtained by polycondensation of the caprolactam, amino-11undecanoic acid or dodecanolactam, respectively, in the presence of adipic acid is reacted with a mixture of oxyethylated amines obtained by addition of n moles of ethylene oxide to a mixture of primary amines derived from fatty acids of tallow, olein or copra in the presence of tetrabutylorthozirconate.

In Table 1 are stated for each example, the nature of the polyamide and of the mixture of oxyethylated amines, the respective medium molecular eight thereof, the quantity of each one of these products, including the catalyst, introduced in the reactor, the duration and temperature of reaction.

For each reaction the vacuum has been made inside of the reactor starting when the desired temperature is reached.

The duration of the reaction corresponds to the period of time between the start of the vacuum and the recovery of the polymer in the form of liquid reeds that solidify and cool by immersion in a vat of water.

The characteristics of each product analyzed are set forth in Table 2.

The products obtained correspond to the following formulae:

with p+q=9.41 and y+z=5 and $R_1$=—$C_{14}H_{29}$ (2%), —$C_{16}H_{33}$ (25%), —$C_{18}H_{37}$ (30%) —$C_{20}H_{41}$ (3%) and 40% of a mixture of —$C_{18}H_{35}$, —$C_{18}H_{33}$ and —$C_{18}H_{31}$.

Formula of the polyetheresteramide obtained in Example No. 6

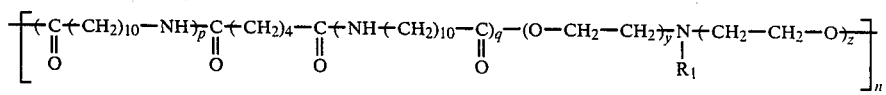

with p+q=10.13 and y+z=5 and $R_1$=—$C_{10}H_{21}$ (3%), —$C_{12}H_{25}$ (60%), —$C_{14}H_{29}$ (20%) —$C_{16}H_{33}$ (10%), and —$C_{18}H_{37}$ (7%).

Formula of the polyetheresteramide obtained in Example No. 7

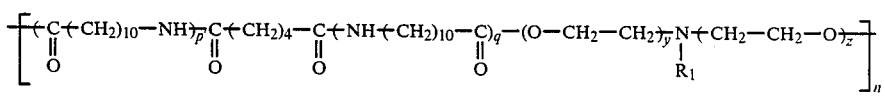

with p+q=10.13 and y+z=4.27 and $R_1$=—$C_{16}H_{33}$ (15%), —$C_{18}H_{37}$ (5%) and 80% of a mixture of —$C_{18}H_{35}$, —$C_{18}H_{33}$ and —$C_{18}H_{31}$.

Formula of the polyetheresteramide obtained in Example No. 8

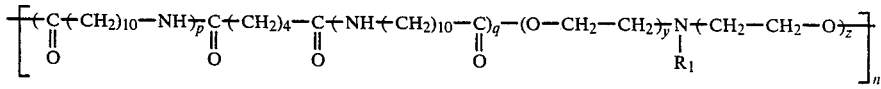

with p+q=10.13 and y+z=11 and $R_1$=—$C_{14}H_{29}$ (2%), —$C_{16}H_{33}$ (25%), —$C_{18}H_{37}$ (30%) —$C_{20}H_{41}$ (3%) and 40% of a mixture of —$C_{18}H_{35}$, —$C_{18}H_{33}$ and —$C_{18}H_{31}$.

Formula of the polyetheresteramide obtained in Example No. 9

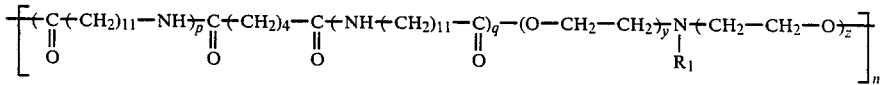

with p+q=3.83 and y=z=1 and $R_1$=—$C_{10}H_{21}$ (3%), —$C_{12}H_{25}$ (60%), —$C_{14}H_{29}$ (20%) —$C_{16}H_{33}$ (10%), and —$C_{18}H_{37}$ (7%).

Formula of the polyetheresteramide obtained in Example No. 10

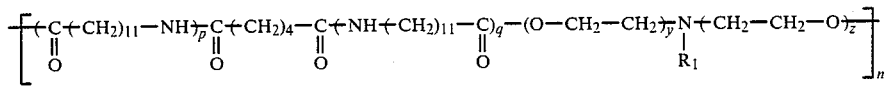

with p+q=9.675 and y+z=7.25 and $R_1$=—$C_{14}H_{29}$ (2%), —$C_{16}H_{33}$ (25%), —$C_{18}H_{37}$ (30%) —$C_{20}H_{41}$ (3%) and 40% of a mixture of —$C_{18}H_{35}$, —$C_{18}H_{33}$ and —$C_{18}H_{31}$.

Formula of the polyetheresteramide obtained in Example 11

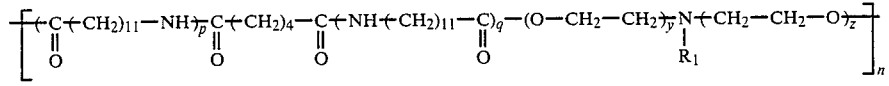

with p+q=9.675 and y+z=9.52 and $R_1$=—$C_{14}H_{29}$ (2%), —$C_{16}H_{33}$ (25%), —$C_{18}H_{37}$ (30%) —$C_{20}H_{41}$ (3%) and 40% of a mixture of —$C_{18}H_{35}$, —$C_{18}H_{33}$ and —$C_{18}H_{31}$.

according to the procedures described in French Pat. No. 2,273,021. The products obtained were granulated, dried and ground on an ARBURG press in the form of 10 standardized test samples. The measures of control and identification of the products obtained are:

inherent viscosity measured in the meta-cresol at 20° C. (0.5 g of product per 100 g of solvent). It is expressed in $dlg^{-1}$.

the melting temperature of the polycondensate, determined by differential thermal analysis.

the SHORE D hardness according to the ASTM D 1484 standard.

PEEA 1 results from the polycondensation of 1400 g

TABLE 1

| Example no | Dicarboxylic Polyamide Nature | Dicarboxylic Polyamide Medium molecular weight g | Nature of the fatty acids | Mixture of oxyethylated amines n | Mixture of oxyethylated amines Medium molecular weight g | Quantity introduced in the reactor g Polyamide diacid | Quantity introduced in the reactor g Oxyethylated Amines | Quantity introduced in the reactor g $Zr(OBu)_4$ | Temperature of reaction (°C.) | Duration of reaction (min.) |
|---|---|---|---|---|---|---|---|---|---|---|
| 5  | 6  | 2 340 | TALLOW | 5    | 480 | 1 638 | 336    | 20   | 245 | 260 |
| 6  | 11 | 2 000 | COPRA  | 5    | 420 | 1 640 | 344.4  | 10.3 | 250 | 160 |
| 7  | 11 | 2 000 | OLEIC  | 4.27 | 450 | 1 600 | 360    | 17.6 | 245 | 400 |
| 8  | 11 | 2 000 | TALLOW | 11   | 745 | 1 500 | 558.75 | 10.3 | 240 | 235 |
| 9  | 12 | 900   | COPRA  | 2    | 290 | 1 548 | 498.8  | 23.3 | 240 | 365 |
| 10 | 12 | 2 050 | TALLOW | 7.25 | 580 | 1 681 | 475.6  | 12.3 | 235 | 255 |
| 11 | 12 | 2 050 | TALLOW | 9.52 | 680 | 1 476 | 489.6  | 6.5  | 235 | 55  |

TABLE 2

| Example no. | Melting Temperature °C. | Inherent Viscosity $dlg^{-1}$ | SHORE D Hardness | Vicat point under 1 Kg °C. | Properties of traction To flow threshold Elongation % | Properties of traction To flow threshold Stress MPa | Properties of traction To rupture Elongation % | Properties of traction To rupture Stress MPa | Properties of flexion Deflection mm | Properties of flexion Stress MPa | Properties of flexion Module MPa |
|---|---|---|---|---|---|---|---|---|---|---|---|
| 5  | 202 | 0.77 | 63 | 180 | 40 | 22.2 | 235 | 35.6 | 23.4 | 11.7 | 416 |
| 6  | 170 | 0.51 | 59 | 152 | 70 | 21.2 | 364 | 32.6 | 25.5 | 8.9  | 324 |
| 7  | 170 | 0.50 | 58 | 155 | 40 | 21.8 | 235 | 22.4 | 28.9 | 8.6  | 264 |
| 8  | 170 | 0.68 | 55 | 155 | 26 | 16.0 | 404 | 36.0 | 24.0 | 6.0  | 209 |
| 9  | 145 | 0.48 | 51 | 110 | 18 | 12.0 | 360 | 23.0 | 27.0 | 6.0  | 194 |
| 10 | 158 | 0.51 | 58 | 147 | 18 | 18.0 | 305 | 28.0 | 26.0 | 10.0 | 293 |
| 11 | 158 | 0.85 | 55 | 144 | 40 | 17.8 | 453 | 34.8 | 27.5 | 7.9  | 256 |

Resistance to water during 7 days at 25° C. of the polyesteramides and polyetheresteramides obtained In order to assess this property, 5 standardized test samples of the different polyesteramides and polyetheresteramides prepared according to the procedures described in Examples 1 to 11 were immersed in water for 7 days at 25° C.

By way of comparison, the same test was effected with polyetheresteramides (PEEA 1 to 6) prepared of a dicarboxylic polyamide 12 of a molecular weight of 2000 obtained from dodecalactam and adipic acid with 280 g of a polyoxyethyleneglycol of a medium molecular weight of 400.

The polyetheresteramide obtained has an inherent viscosity of 1.33 $dlg^{-1}$, a melting temperature of 158° C. and a SHORE D hardness of 59.

It corresponds to the following formula:

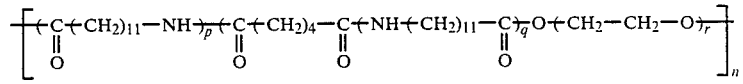

with p+q=9.41 and r=8.68.

PEEA 2 results from the polycondensation of 1400 g of the dicarboxylic polyamide 12 used in the preparation of PEEA 1 with 420 g of a polyoxyethylene glycol having a medium molecular weight of 600. The polyether-ester-amide obtained has an inherent viscosity of 1.14 dlg$^{-1}$, a melting temperature of 168° C. and a SHORE D hardness of 58.

It corresponds to the following formula:

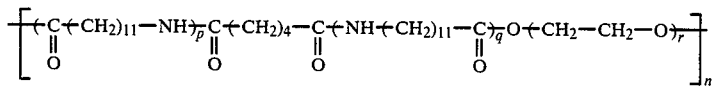

with p+q=9.41 and r=13.23.

PEEA 3 results from the polycondensation of 1000 g of a dicarboxylic acid polyamide 12 having a medium molecular weight of 850 obtained from dodecanolactam and adipic acid with 470.6 g of the polyoxyethylene glycol used in the preparation of PEEA 1.

The resulting polyetheresteramide has an inherent viscosity of 0.81 dlg$^{-1}$, a melting temperature of 138° C. and a SHORE D hardness of 44.

It corresponds to the following formula:

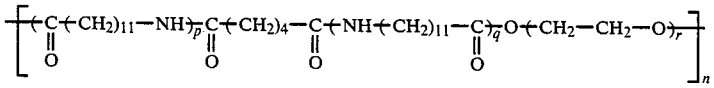

with p+q=3.57 and r=8.68.

PEEA 4 results from the polycondensation of 918 g of the dicarboxylic polyamide 12 used in the preparation of PEEA 3 with 648 g of the polyoxyethylene glycol used in the preparation of PEEA 2. The polyetheresteramide obtained has an inherent viscosity of 0.96 dlg$^{-1}$, a melting temperature of 145° C. and a SHORE D hardness of 42.

It corresponds to the following formula:

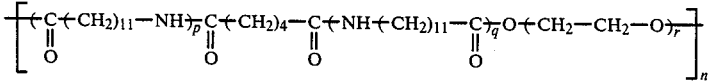

with p+q=3.57 and r=13.23.

PEEA 5 results from the polycondensation of 1300 g of a dicarboxylic polyamide 11 having a medium molecular weight of 2000, prepared from amino-11-undecanoic acid and adipic acid and 260 g of the polyoxyethylene glycol used in the preparation of PEEA 3. The polyetheresteramide obtained has an inherent viscosity of 0.87 dlg$^{-1}$, a melting temperature of 175° C. and a SHORE D hardness of 56.

It corresponds to the following formula:

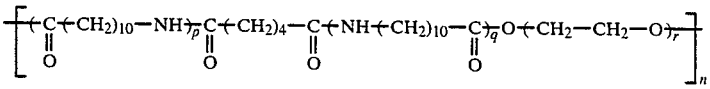

with p+q=10.13 and r=8.68.

PEEA 6 results from the polycondensation of 1309 g of a dicarboxylic polyamide 6 having a medium molecular weight of 1540, prepared from caprolactam and adipic acid with 340 g of the polyoxyethylene glycol used in the preparation of PEEA 5. The polyetheresteramide obtained has an inherent viscosity of 1.03 dlg$^{-1}$, a melting temperature of 202° C. and a SHORE D hardness of 56.

It corresponds to the following formula:

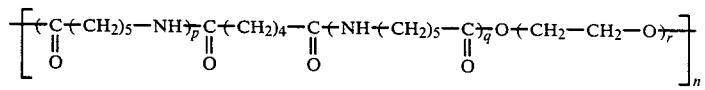

with p+q=12.34 and r=8.68.

The recovery in weight after 7 days at 25° C., in water, of the polyesteramides and polyetheresteramides of Examples 1 to 11 and of the polyetheresteramides PEEA 1 to 6 is given in the following table:

TABLE 3

| Polyesteramides and Polyetheresteramides | | Polyetheresteramides | |
|---|---|---|---|
| $+C-A-C-O-B-N-B'-O+_n$ | | $+C-A-C-O-B-O+_n$ | |
| $\phantom{+}\|\phantom{-A-}\|\phantom{-O-B-}\|$ | | $\phantom{+}\|\phantom{-A-}\|$ | |
| $\phantom{+}O\phantom{-A-}O\phantom{-O-B-}R_1$ | | $\phantom{+}O\phantom{-A-}O$ | |
| Example no. | Recovery in weight % | n° of PEEA | Recovery in weight % |
| 1 | 0.57 | | |
| 2 | 3.00 | 1 | 3.97 |
| 3 | 3.59 | | |
| 4 | 0.76 | 2 | 10.01 |
| 5 | 17.60 | | |
| 6 | 0.82 | 3 | 10.76 |
| 7 | 0.85 | | |
| 8 | 2.92 | 4 | 27.45 |
| 9 | 0.74 | | |
| 10 | 1.24 | 5 | 4.71 |

TABLE 3-continued

| | Polyesteramides and Polyetheresteramides $+C-A-C-O-B-N-B'-O+_n$ $\phantom{+}\|\phantom{-A-}\|\phantom{-O-B-}\|$ $\phantom{+C}O\phantom{-A-}O\phantom{-O-B-}R_1$ | | Polyetheresteramides $+C-A-C-O-B-O+_n$ $\phantom{+}\|\phantom{-A-}\|$ $\phantom{+C}O\phantom{-A-}O$ | |
|---|---|---|---|---|
| Example no. | Recovery in weight % | n° of PEEA | Recovery in weight % | |
| 11 | 4.00 | 6 | 21.31 | |

What is claimed is:

1. Polyesteramides and polyetheresteramides of the formula

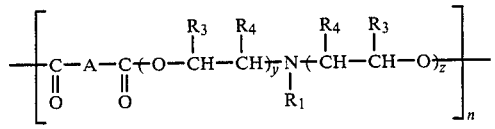

wherein

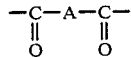

represents a dicarboxylic acid polyamide sequence having a medium molecular weight between 300 and 15,000;

$R_3$ and $R_4$ represent hydrogen or only one of the two represents hydrogen the other one being an alkyl radical containing from 1 to 24 carbon atoms;

$R_1$ is a linear or branched, saturated or unsaturated alkyl radical containing from 1 to 24 carbon atoms or an aromatic or cycloaliphatic radical;

$y+z$ has a value between 2 and 100, each being at least equal to 1; and n represents the number of recurrent units that constitute the macromolecular chain; and wherein the proportion by weight of the group

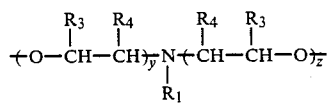

represents from 2 to 90% of the total group

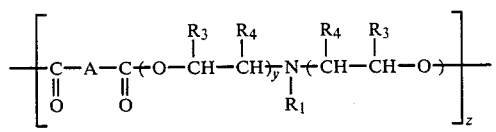

wherein A, R, $-R_4$, y and z are as indicated.

2. Polyesteramides and polyetheresteramides according to claim 1, wherein $R_3$ or $R_4$ represents $-CH_3$.

3. Polyesteramides and polyetheresteramides according to claim 1 or 2, wherein n is between 1 and 75.

4. Polyesteramides and polyetheresteramides according to claim 1 or 2, wherein the dicarboxylic polyamide sequence

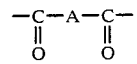

has the formula

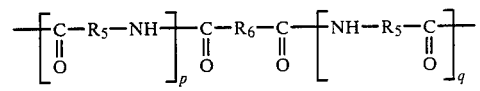

wherein $R_5$ is a hydrocarbon chain constituting a lactam and-/or an aminoacid of the structure

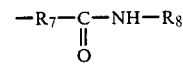

wherein $R_7$ and $R_8$ are respectively the hydrocarbon residue of a diacid and of a diamine, $R_6$ represents the rest of an organic diacid, p and q are identical or different, and one of them can be zero, represent a repetition of a number of recurrent units that constitute the macromolecular chain of the dicarboxylic polyamide sequence.

5. Polyesteramides and polyetheresteramides according to claim 4, wherein the hydrocarbonated chain of $R_5$ contains from 4 to 14 carbon atoms.

6. Polyesteramides and polyetheresteramides according to claim 4 wherein $R_6$ is an aliphatic, cycloaliphatic or aromatic group.

7. Polyesteramides and polyetheresteramides according to claim 4, wherein the medium molecular weight of the dicarboxylic polyamide sequence is between 300 and 15000, p+q being between 1 and 100.

8. A process for the preparation of the polyesteramides and polyetheresteramides of the formula

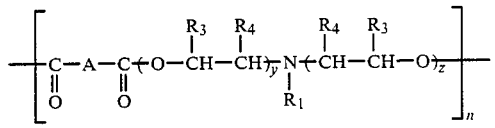

wherein

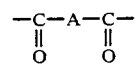

represents a dicarboxylic acid polyamide sequence having a medium molecular weight between 300 and 15,000;

$R_3$ and $R_4$ represent hydrogen or only one of the two represents hydrogen, the other one being an alkyl radical containing from 1 to 24 carbon atoms;

$R_1$ is a linear or branched, saturated or unsaturated alkyl radical containing from 1 to 24 carbon atoms or an aromatic or cycloaliphatic radical;

$y+z$ has a value between 2 and 100, each being at least equal to 1; and $y+z$ has a value between 2 and 100, each being at least n n represents the number of recurrent units that constitute the macromolecular chain; and wherein the proportion by weight of the group

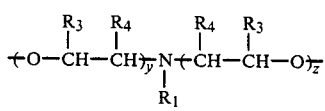

represents from 2 to 90% of the total group

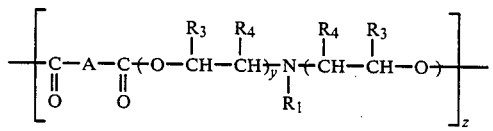

said process comprising reacting a dicarboxylic polyamide whose acid functions are situated at the ends of the chain with an α,ω diol, wherein said α,ω diol is a di beta hydroxylated tertiary amine or a polyoxyalkylene glycol containing in the chain a tertiary amine function of the formula

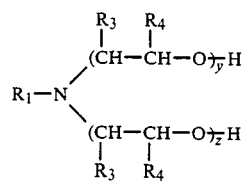

wherein $R_1$, $R_3$, $R_4$, y and z are as indicated.

9. A process according to claim 8, wherein there are reacted by weight from 98 to 10% of a dicarboxylic polyamide with from 2 to 90% of an α,ω diol.

10. A process according to claim 8, wherein the reagents are reacted substantially taking into consideration the stoichiometry between the carboxylic groups of the polyamide and the hydroxyl groups of the α,ω diol including a tertiary amine function per molecule.

11. A process according to claim 8, wherein the polycondensation is effected by mixing in a molten state the reagents in the presence of catalyst.

12. A process according to claim 8, wherein the catalyst is of the formula $M(OQ)_4$ wherein:

M represents titanium, zirconium or hafnium and

Q is a linear or branched alkyl radical having from 1 to 24 carbon atoms.

* * * * *